No. 647,043. Patented Apr. 10, 1900.
F. C. H. STRASBURGER.
BOTTLE LABELING MACHINE.
(Application filed Feb. 11, 1899.)

(No Model.) 6 Sheets—Sheet 1.

Fig. 1.

Witnesses.
Wm. M. Rheem
C. L. Wood

Inventor
Frank C. H. Strasburger
by Wm. O. Belt atty

No. 647,043. Patented Apr. 10, 1900.
F. C. H. STRASBURGER.
BOTTLE LABELING MACHINE.
(Application filed Feb. 11, 1899.)

(No Model.) 6 Sheets—Sheet 2.

Fig. 2.

No. 647,043. Patented Apr. 10, 1900.
F. C. H. STRASBURGER.
BOTTLE LABELING MACHINE.
(Application filed Feb. 11, 1899.)

(No Model.) 6 Sheets—Sheet 3.

Witnesses.
Wm. M. Rheem
C. L. Wood.

Inventor
Frank C. H. Strasburger
by Wm. O. Belt. Atty.

No. 647,043. Patented Apr. 10, 1900.
F. C. H. STRASBURGER.
BOTTLE LABELING MACHINE.
(Application filed Feb. 11, 1899.)
(No Model.)
6 Sheets—Sheet 4.

Fig. 4.

Witnesses.
Wm. M. Rheem
C. L. Wood

Inventor
Frank C. H. Strasburger
by Wm. O. Belt, atty.

No. 647,043. Patented Apr. 10, 1900.
F. C. H. STRASBURGER.
BOTTLE LABELING MACHINE.
(Application filed Feb. 11, 1899.)

(No Model.) 6 Sheets—Sheet 6.

Witnesses.
Wm M. Rheem.
C. L. Wood.

Inventor
Frank C. H. Strasburger
by Wm O. Belt
Atty.

THE NORRIS PETERS CO., PHOTO-LITHO., WASHINGTON, D. C.

UNITED STATES PATENT OFFICE.

FRANK C. H. STRASBURGER, OF CHICAGO, ILLINOIS.

BOTTLE-LABELING MACHINE.

SPECIFICATION forming part of Letters Patent No. 647,043, dated April 10, 1900.

Application filed February 11, 1899. Serial No. 705,209. (No model.)

*To all whom it may concern:*

Be it known that I, FRANK C. H. STRASBURGER, a citizen of the United States, residing at Chicago, in the county of Cook and State of Illinois, have invented certain new and useful Improvements in Bottle-Labeling Machines, of which the following is a specification.

My invention relates to improvements in bottle-labeling machines, and particularly to that class in which the machine is set in operation when the bottle is placed in position to receive the label, although I do not limit myself in the use of all the devices and mechanisms hereinafter described to a machine of this special type.

The primary object of the invention is to provide a strong and substantial machine of this character positive in its action and capable of being operated by any one who is able to insert a bottle in the right position.

Another object is to provide a machine which can be easily and quickly adapted to operate with labels of any size, is rapid in its action, and whose capacity for affixing labels is governed only by the rapidity with which bottles can be arranged in position to receive them.

A further object of the invention is to affix one label to the bottle and carry another label into position to be affixed to the next bottle at each complete operation of the machine.

Further objects of the invention are to provide for regularly transferring the labels from a pile to the affixing position regardless of the number of labels in the pile; to stamp a date, &c., on the back of the label before it is affixed; to apply paste to portions of the label at and during the transferring or feeding operation; to press and hold the label against the bottle, so that the affixing devices will affix it properly on the bottle and in the predetermined position; to ink the stamp device at each operation of the machine, and to do many other things and accomplish numerous other results, which all together provide a strong and simple rapid and accurate automatic machine, all of which will be fully and clearly pointed out hereinafter.

With these and other ends in view I have illustrated my invention in the accompanying drawings, in which—

Referring to the drawings, in which like numerals of reference denote corresponding parts in all the figures, 1 designates a frame of any kind suitable for supporting the different mechanisms of the machine, and 2 is the main shaft, provided with a belt-wheel 3, to which power is communicated by any preferred means and from any source. A rest 4, having an angular seat therein, is provided for the bottle at the front of the frame, and it is mounted on a vertically-adjustable support 5, operating through a part of the frame and held in place by an adjusting-screw 6. By this means bottles of any size can be accommodated, and the angular rest insures that the bottle will be fixed in its proper position to receive the label and held substantially stationary.

Figure 1:
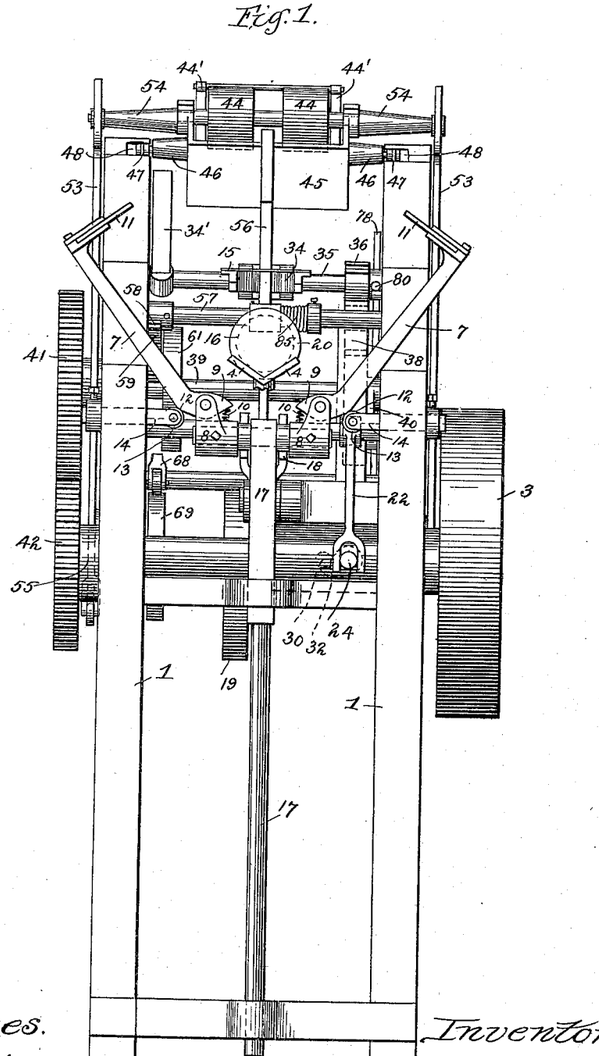
Figure 1 is a front view of my improved machine, showing the parts in their normal position and a bottle 16 in place on the rest.
Figures 3, 11:
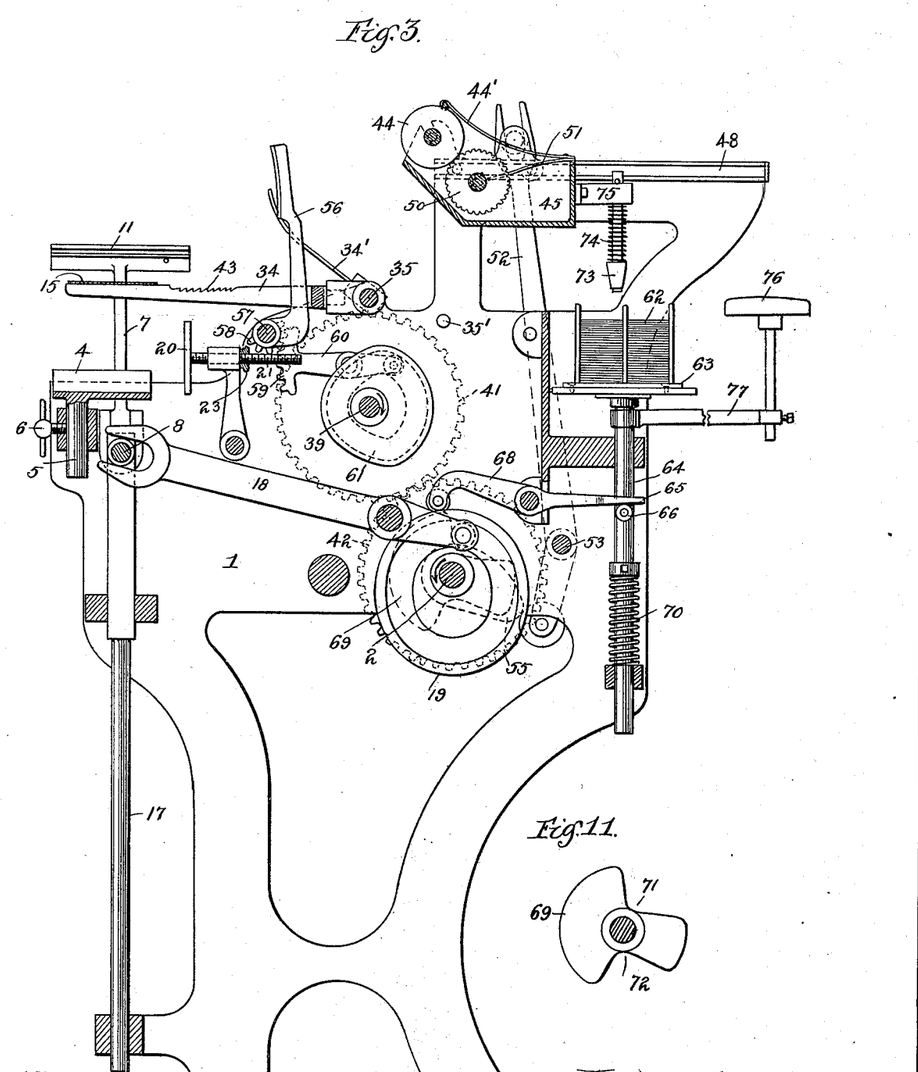
Fig. 3 is a similar view from the other side of the machine, the parts being at rest in their normal position.
Fig. 11 is a detail view of the label-supply-actuating cam 69.

The label is affixed to a bottle by means of devices which descend and press the label against the bottle, paste having been previously applied to the back of the label. These devices comprise a pair of arms 7, pivotally mounted on a support 8 and each provided with a toe 9, projecting outwardly from its pivoted end to bear upon a spring 10, located between the support and the toe. The upper ends of the arms are provided with wipers 11, which engage and press the label against the bottle, the wipers shown in the drawings consisting of pieces of heavy flat rubber; but instead of this kind of wiper I may employ rollers, which will accomplish the same result. The springs 10 hold the wipers normally separated, Fig. 1; but when the support 8 is lowered the shoulders 12 on the arms ride against the friction-rollers 13 on the studs 14, and this brings the arms together and the wipers into position to engage the label 15 and bottle 16. The wipers press against the label and bottle, Fig. 8, and being elastic they give sufficient to permit the arms to continue their downward movement past the bottle, the bottle being removed after the wipers have passed it. The support for the arms 7 is carried on a vertically-movable bar 17, operating in bearings in the frame and actuated by means of a lever 18, pivoted on the frame and having one end engaging with the support and its other end provided with a roller operating in the grooved cam 19, Fig. 3.

The machine is set in motion by means of a trip device, which is actuated by the placing of a bottle in position in the machine. This trip device comprises a plate 20, mounted on a screw 21 and supported behind the bottle on a trip-lever 22, pivoted on the frame. The screw is adjusted in the end of the trip-lever according to the size of the bottles to be labeled and secured by a thumb-nut 23, thereby providing for bottles of different size and also to enable the machine to put the label on the bottle at any part thereof. By simply adjusting the trip-plate 20 longer or shorter bottles can be provided for and the label can be put on any part of the body, shoulder, or neck of the bottle.

Figure 6:
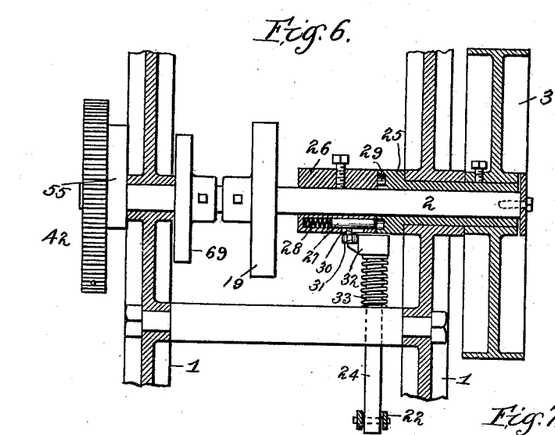
Fig. 6 is a sectional view on the line 6 6 of Fig. 2, showing the main shaft and clutch device.

The lower end of the trip-lever is connected to a bar 24, which operates the clutch device to throw the machine into and out of action. One member 25 of the clutch is rigid with the belt-wheel 3, and the other member 26 is fixed on the main shaft, Fig. 6. A spring-actuated clutch-bolt 27 is carried by the shaft member 26, and it is adapted to be forced forward by its spring 28 to engage one of a series of holes 29 in the face of the belt-wheel member 25. The clutch-bolt is provided with a pin 30, carrying a roller 31, which engages a cam 32, Figs. 1 and 7, on the end of the bar 24 when the machine is at rest; but when this clutch-bar is drawn forward by the operation of the tripper device the roller 31 is released from engagement with the cam 32, and the clutch-bolt is projected forward to enter a hole 29 in the member 25, and thereby effect an engagement of the two clutch members and start the machine in motion. The spring 33 returns the clutch-bar and cam 32 into position to be engaged by the roller 31, which causes the clutch-bolt to be withdrawn, opens the clutch, and stops the machine.

Figure 2:
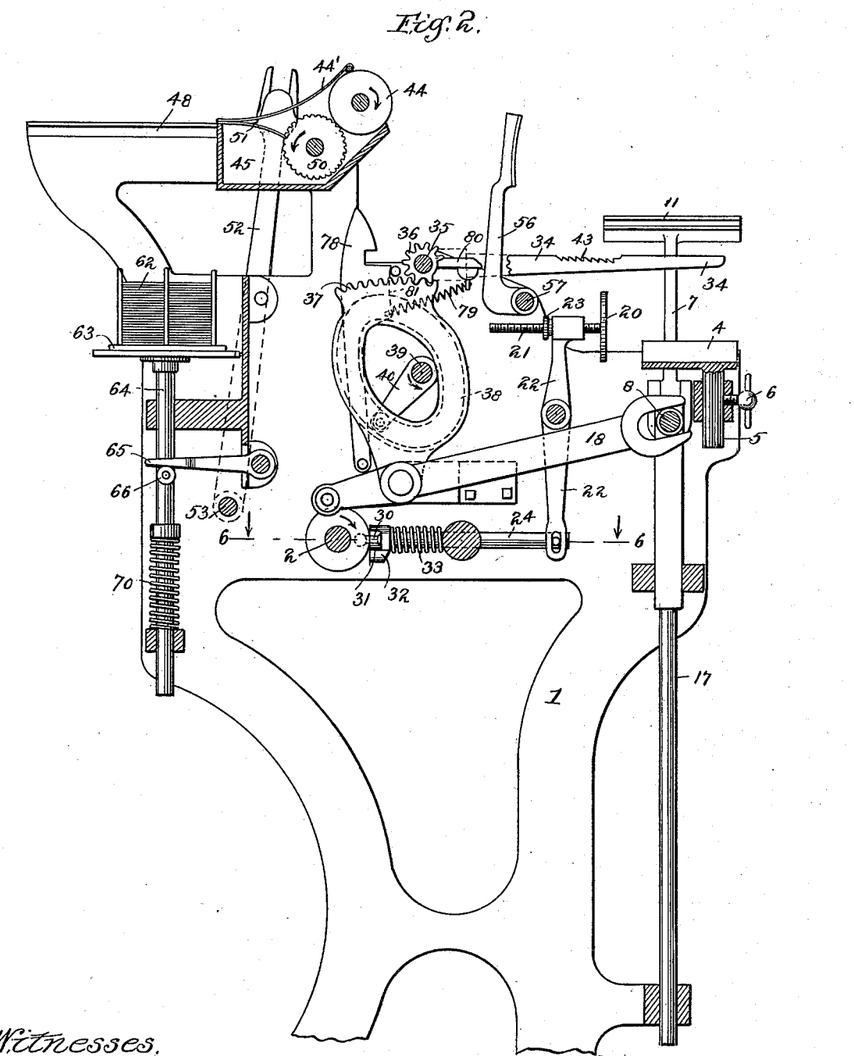
Fig. 2 is a sectional view through the middle of the machine, showing the parts in their position when the machine is at rest.
Figures 7, 8, 9, 10:
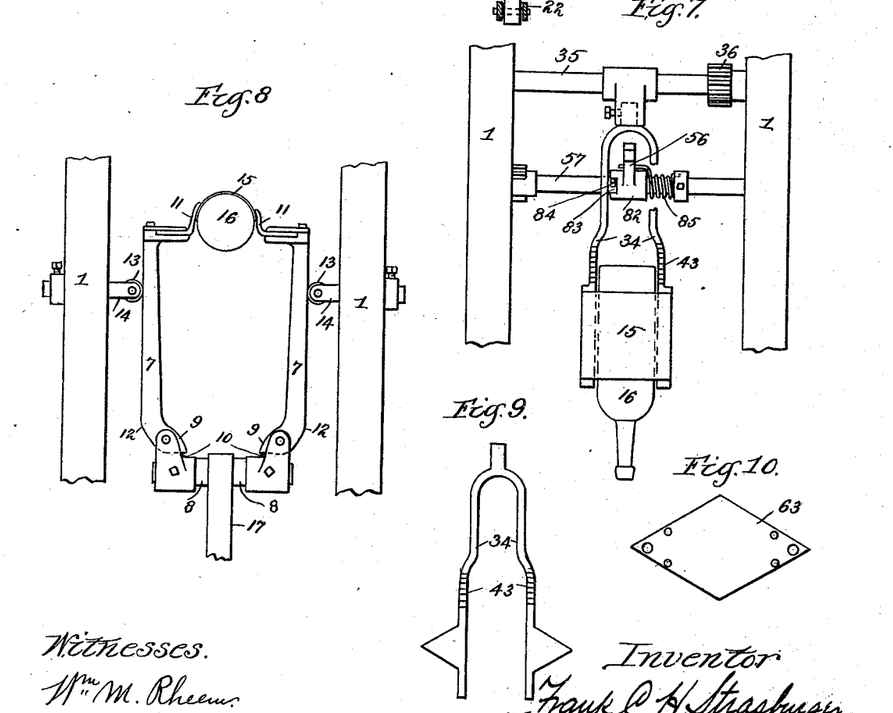
Fig. 7 is a plan view of the carrying device and holder with their shafts.
Fig. 8 is a front view, enlarged, of the affixing devices.
Figs. 9 and 10 are detail views of the carrying device and label-holder, showing different forms of these parts.

Each label is carried from the pile into position above the bottle-rest 4 by a swinging device comprising a forked or bifurcated arm 34, rigidly mounted on the rock-shaft 35, Figs. 2 and 7. A pinion 36 is fixed on this carrier rock-shaft, and it meshes with a segmental rack 37 on the label-carrier grooved actuating-cam 38, pivoted on the frame. A shaft 39 is journaled in bearings in the frame, and it carries an arm 40, having a roller which operates in the groove of the cam 38, and also a gear-wheel 41, Figs. 1 and 3, which meshes with another gear-wheel 42 on the main shaft. The carrying-arm device is swung back to get a label, Fig. 5, and forward to carry it into position to be affixed to the bottle, Figs. 2 and 3, by the cam 38, the rack 37 rocking the shaft 35 through the pinion 36.

Figure 4:
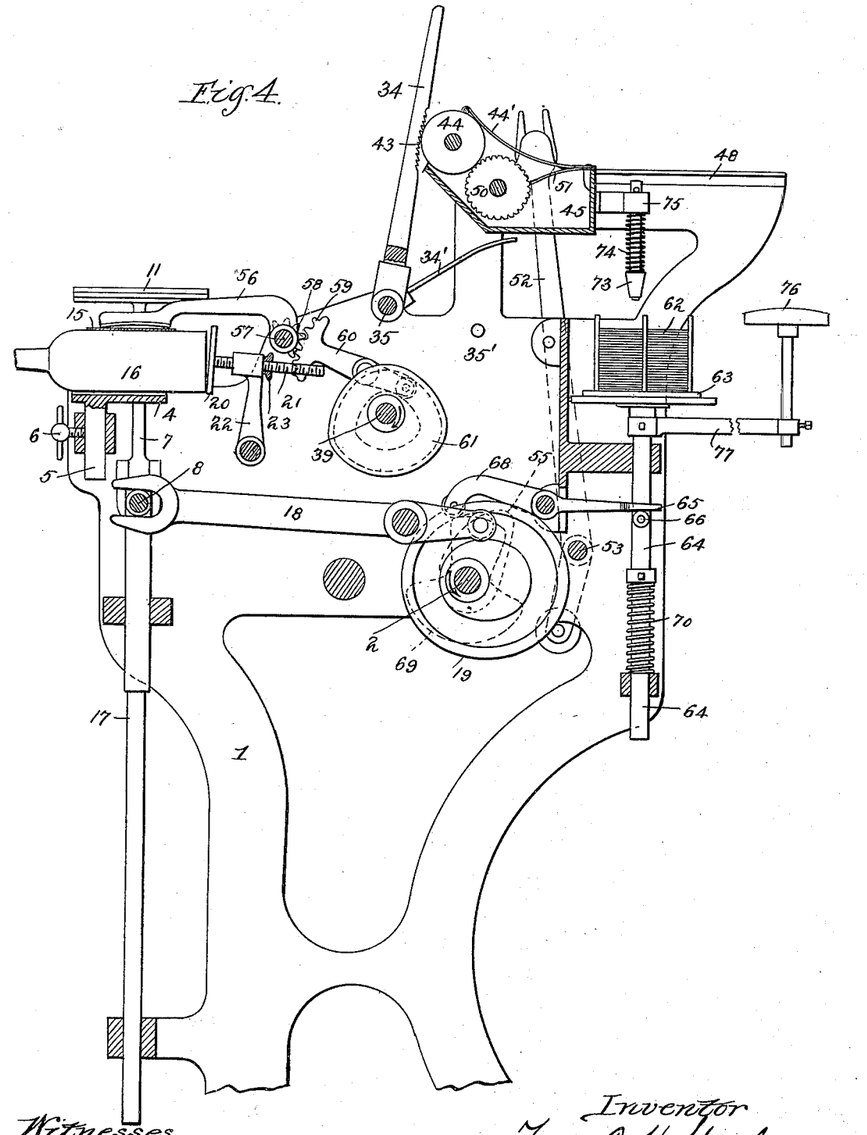
Fig. 4 is a view similar to Fig. 3, showing the parts after the bottle has tripped the tripper, the holder has descended to press the label against the bottle, and the carrying device has swung into engagement with the paste device, the affixing devices beginning their descent, the label-supply having completed the movement during which it has engaged the stamp device.
Figure 5:
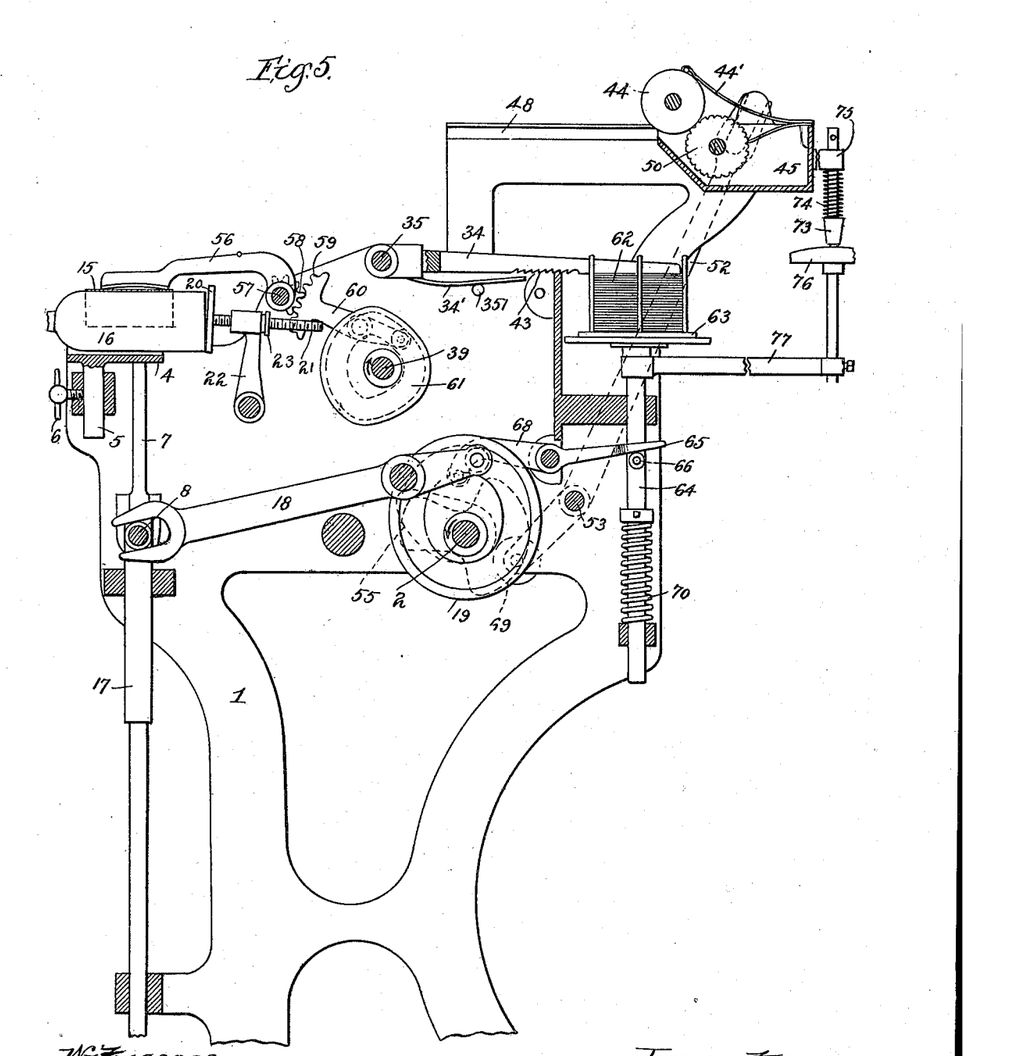
Fig. 5 is a view similar to Figs. 3 and 4, showing the parts at the completion of one-half a revolution of the main shaft, the carrying device engaging the label-supply, the stamp engaging the inking-pad, the holder and affixing devices down, and all the parts ready to resume their normal positions.

The swinging label-carrying arm 34 is provided with a roughened or corrugated portion 43, which engages the paste-roller 44 when it is swung back, Fig. 4, and pushes the paste roller and pot 45 backward, Fig. 5. A spring-scraper 44' is fastened on the pot and bears against the paste-roller to scrape off the surplus paste. The paste-pot is supported on the arms 46, which are provided on their ends with rollers 47 to travel horizontally in the ways 48 on the sides of the frame. A feed-roller 50, having a roughened surface, is located below the paste-roller, and it is held in contact therewith by the spring-arm 51. The pot is returned to its normal forward position by the levers 52, mounted on the rock-shaft 53, the upper ends of these levers being forked to receive the arms 54 on the paste-pot. A cam 55 on the main shaft engages the lower end of the lever 52 and actuates it to carry the paste-pot from its rearward position, Fig. 5, to its normal forward position, Fig. 3. A spring 34' is carried on the shaft 35, which travels with the arm 34 and engages a stop 35' on the frame to lessen the jar when the carrying-arm reaches the limit of its rearward movement.

The roughened portion of the arm 43 engages the paste-roller first, and as the paste-pot is forced rearward that part of the arm which takes up the label rides over the paste-roller and receives sufficient paste to cause the label to stick thereto and take off enough to stick to the bottle when pressed thereon. The parts are so timed that after the carrying-arm has picked up a label it swings back to its forward position and the paste-pot is moved forward by the cam 55.

In order to hold the label against the bottle during the affixing operation and also to release the label from the carrying device, I provide a holder comprising an arm 56, mounted on a holder rock-shaft 57, which also carries a pinion 58. This pinion meshes with a toothed segment 59 on one end of the lever 60, which is pivoted to the frame, and has its other end provided with a roller, which operates in the grooved cam 61 on the shaft 39, Fig. 3. This holding-arm swings down when the machine is started and engages the label between the forked end of the carrying-arm and holds the label against the bottle, permitting the carrying-arm to swing back without the label.

The labels are arranged in a pile 62 in the label-holder 63, which is suitably mounted on the vertically-movable rod 64. This rod is moved downward and held by an arm 65 on the rock-shaft 67, the arm engaging a roller 66, carried on the rod. Another arm 68 is fixed on this shaft, and it operates in contact with a cam 69 on the main shaft. A spring 70 on the rod 64 moves the rod upward when the pressure of the arm 65 is removed to carry the pile of labels upward, first, against a dating-stamp, and, second, against the label-carrying arm, the cam 69 being provided with two cavities 71 72 to accomplish this movement of the rod 64. The labels are arranged in the pile bottom up, and a dating-stamp 73, Fig. 3, of any suitable kind, is carried on the spring-pressed rod 74, supported from the arm 75 on the paste-pot, so that in the first upward movement of the pile of labels the back of the top label in the pile will be brought against the stamp to receive an impression of the date or any other desired information from the stamp. The pile of labels is then carried down sufficient to permit the stamp to move with the paste-pot rearward, and when the pile of labels next moves upward to bring the top label into contact with the carrying-arm, Fig. 5, the stamp engages an inking-pad 76, supported on an arm 77, secured on the label-supporting rod 64. The spring 70 always carries the labels up far enough to engage the stamp and the carrying-arm, regardless of the number of labels in the pile, and also carries the inking-pad up to engage the stamp.

To hold the label-carrying arm rigid when the pile of labels is brought up against it, I provide a locking device comprising a latch 78, Fig. 2, pivoted on the frame and normally drawn forward by a spring 79, so that it will engage a lug 80 on the shaft 36 and temporarily lock the arm 34 in its rearward position. The latch is released by the arm 40, which swings around and engages the latch on its edge 81, forcing the latch backward until the lug 80 is disengaged therefrom and permitting the arm 34 to swing forward with the label.

I provide a compensating device on the holder rock-shaft 57, so that it may always move in the same arc regardless of the precise limit of downward movement of the holder-arm, which will vary in its movement with the size of the bottle and its position on the rest. The holder-arm, Fig. 8, is mounted on a collar 82, which has a cut-out 83 at one side, in which the pin 84 on the shaft 57 operates. A spring 85, fastened on the shaft, forces the holder-arm down when the shaft rocks, and even though the arm does not move to the limit of its possible downward movement, as controlled by the movement of the shaft, the latter may continue to complete its movement by reason of the cut-out 83. The pin 84 engaging the collar carries the holder-arm back to its upright position when the shaft rocks backward.

The forked end of the label-carrying arm applies sufficient paste to the label to cause it to stick to the bottle, and this paste is applied to the side edges of the label where the carrying-arm contacts therewith, Fig. 7. It is obvious, therefore, that the shape of the forked end of the arm will preferably be varied to suit labels of different size, and to accomplish this a variety of arms may be provided, although two or three will be sufficient for all ordinary uses. If an angular label is used, the arm would be shaped as indicated in Fig. 9, so that paste would be applied to the corners or corner edges only. The same result can be accomplised, of course, by simply changing the ends of the forked part of the carrying-arm. The label-holder will also be preferably shaped to correspond with the shape of the label, and such a holder as is shown in Fig. 10 would be used with labels of that angular character and with the carrying-arm shown in Fig. 9.

The operation of the machine is entirely automatic, and the power is applied to set the parts in action by the insertion of the bottle in position to receive a label. Assuming that the carrying-arm is supporting a label 15 in its normal position, Fig. 3, while the machine is at rest, the first operation is to place a bottle on the rest 4 and against the tripper 20, the several parts of the machine having been previously adjusted to accommodate the particular label and bottle which are used. When the tripper is tripped by being pushed back by the bottle, the clutch-bar 24 is withdrawn to release the cam 32 from the clutch-bolt 27, thereby permitting this bolt to move forward into one of the holes 29 and throw the clutch. The main shaft is then rotated and the holder-arm is swung down upon the label held by the carrying-arm and presses it against the bottle. At this time, also, the pile of labels is carried up against the stamp and down again. The carrying-arm then swings upward and back against the paste-roller, Fig. 4, and pushes the paste-pot back until the arm has cleared the paste-roller and swung down into position to engage the label-pile. The pile of labels then moves up to engage the carrying-arm, and the stamp is inked at the same time. The carrying-arm is locked by the latch just as soon as it reaches the position shown in Fig. 5. Meanwhile the affixing devices have been carried down against the label and affixed it to the bottle.

The bottle is then removed, the parts of the machine return to their normal position, and the carrying-arm supports another label in position for the next bottle.

It will be observed that the operations of the several parts of the machine are positive and automatic and are set in motion by the insertion of the bottle in the machine. Therefore the machine can be operated by any one who is able to place a bottle in the machine, and no particular skill is required for this purpose. The machine also operates very rapidly and accurately, is free of weak parts, and does not easily get out of order.

Having thus fully described the invention, what I claim as new, and desire to secure by Letters Patent, is—

1. In a bottle-labeling machine, the combination with a bottle-rest, a main shaft and a clutch mechanism, of a trip-lever pivoted in the frame of the machine adjacent to the bottle-rest and projecting upward in position to be engaged and operated by pressing the bottle against said lever when the bottle is inserted in the machine, to set the machine in action, substantially as described.

2. In a bottle-labeling machine, the combination with a bottle-rest, of a vertically-arranged trip device projecting up behind the bottle-rest to be engaged and operated by the bottle and capable of being adjusted to accommodate bottles of different lengths, substantially as described.

3. In a bottle-labeling machine, the combination of a bottle-rest and a tripper device located behind the bottle-rest and comprising a lever pivoted in the frame of the machine, and an adjustable plate carried by said lever and arranged to be engaged by the bottom of the bottle when the latter is inserted in the machine on the rest, substantially as described.

4. In a bottle-labeling machine, the combination of a label-supply holder, affixing means, a label-carrier moving in the arc of a circle and normally holding a label in position to be affixed, a clutch mechanism for throwing the machine into and out of action, and a tripper device in position to be operated by pressing the bottle against said device when the bottle is arranged in the machine for throwing the clutch and thereby causing the affixing means to affix the label, said affixing means and carrier being so timed that the former operates while the latter swings back to the label-supply and carries another label therefrom into position to be affixed to the next bottle, substantially as described.

5. In a bottle-labeling machine, the combination of a bottle-rest, a label-supply holder, affixing means, a pivoted label-carrier moving in the arc of a circle, a clutch mechanism for throwing the machine into and out of action, and a pivoted tripper device located adjacent to the bottle-rest and adapted to be rocked by pressing the bottle against said device when the bottle is arranged in the machine to throw the clutch, substantially as and for the purpose described.

6. In a bottle-labeling machine, the combination of a label-supply holder, affixing means, a swinging device for carrying the label from the supply into position to be affixed, a clutch mechanism for throwing the machine into and out of action, and a trip device projecting upward in the path of the bottle and adapted to be operated by pressing the bottle against the same when the bottle is arranged in the machine for automatically throwing the clutch and starting the machine, substantially as described.

7. In a bottle-labeling machine, the combination of a label-supply holder, a bottle-rest, affixing means, a continuously-rotating power-wheel, a clutch mechanism for throwing the machine into and out of operative connection therewith, a rock-shaft, a trip device carried by said rock-shaft and located adjacent to the bottle-rest, whereby the placing of a bottle in proper position on the rest will press against the trip device and throw the clutch and set the machine in action, a label-carrier holding a label in position to be affixed when the machine is unclutched, and mechanism operating when the machine is started to cause the carrier to discharge its label and carry another from the supply into position to be affixed to the next bottle, substantially as described.

8. In a bottle-labeling machine, the combination with a label-supply holder and affixing means, of a swinging device for carrying a label from the supply into position to be affixed to a bottle, and a device for locking the carrying device temporarily in its rearward position, substantially as described.

9. In a bottle-labeling machine, the combination with a label-supply holder and affixing means, of a device for carrying a label from the supply into position to be affixed to a bottle, means for moving the supply of labels into contact with the carrying device, and a latch device for locking the carrying device just before it is engaged by the supply of labels, substantially as described.

10. In a bottle-labeling machine, the combination of a label-supply holder, affixing means, a forked device for carrying a label from the supply into position to be affixed, a holder mounted between the pivot of the carrier and the bottle and arranged to operate between the forked end of the carrier to press and hold the label against the bottle and release it from the carrier so that the carrier may return for another label while the first is being affixed, a clutch device, and a tripper in position to be operated by the bottle when it is inserted in the machine to throw the clutch and cause the holder to descend and engage the label and actuate the affixing means and carrier, substantially as described.

11. In a labeling-machine, the combination with a device for supporting a bottle therein, of a rock-shaft traveling in a fixed arc, a holder mounted on said rock-shaft and adapted to be actuated thereby, and means for permitting the rock-shaft to complete its movement without carrying the holder to the full limit of its downward movement, substantially as described.

12. In a bottle-labeling machine, the combination with a device for supporting a label therein, of a rock-shaft traveling in a fixed arc, a holder loosely mounted on said shaft, and connections between the rock-shaft and the holder whereby the holder is carried down to press on the label and bottle and returned to its upright position by the rocking movement of the shaft, substantially as described.

13. In a bottle-labeling machine, the combination of a label-supply holder, affixing means, a swinging label-carrying device, and a paste device reciprocating in horizontal ways above the label-supply and provided at its front with a paste-roller arranged in the path of the swinging label-carrying device during a part of its rearward movement and adapted to be engaged and pushed rearward in its ways by the carrier as it swings backward and slides over the paste-roller in its passage to the label-supply, substantially as described.

14. In a bottle-labeling machine, the combination of a label-supply holder at the back of the machine, affixing means at the front of the machine, a swinging label-carrier, a horizontally-reciprocating paste device traveling in ways and arranged in the path of and adapted to be pushed by said carrier during its rearward movement to get a label from the supply, and means for returning the paste device to its normal forward position after the carrier has carried a label from the supply into position to be affixed, substantially as described.

15. In a bottle-labeling machine, the combination with a swinging label-carrier, of a paste device traveling in horizontal ways and normally in a forward position, within the arc of the circle described by the carrier, while the carrier is holding a label in position to be affixed, and adapted to be engaged by the carrier on its rearward movement and pushed backward thereby out of the way of the carrier as the latter moves to the limit of its rearward movement, and means for returning the paste device, substantially as described.

16. In a bottle-labeling machine, the combination with a label-supply holder and a swinging-carrier, of a horizontally-reciprocating paste device, said device being pushed backward by the carrier when it swings down to the label-supply to get a label and remaining in this position until the carrier swings forward again, and means for returning the paste device to its forward position, substantially as described.

17. In a bottle-labeling machine, the combination of a label-supply holder, affixing means, a device for carrying a label from the supply into position to be affixed to a bottle, a horizontally-movable paste device arranged in the path of the label-carrying device on its rearward movement, and a holder device mounted between the pivot of the carrying device and the bottle for pressing and holding the label against the bottle before the affixing means begin to operate to disengage the label from the carrying device and hold it properly on the bottle while the affixing means operate, substantially as described.

18. In a bottle-labeling machine, the combination of a vertically-movable label-supply holder, vertically-operating affixing means, a swinging label-carrier, a swinging holder, a paste device reciprocating horizontally above the label-supply, a main shaft, a clutch mechanism on said shaft, and a tripper device connected with said clutch and adapted to be operated by the insertion of a bottle in the machine to set the machine in action and operate the holder, carrier, affixing means and label-supply holder and return the paste device to its forward position after the carrier has carried another label into position to be affixed, substantially as described.

19. In a labeling-machine, the combination with a holder for a supply of labels and means for affixing a label to a bottle, of a swinging device for carrying a label from the supply into position to be affixed to a bottle, a movable paste device arranged in the path of the label-carrier, a stamp carried by said paste device and adapted to engage the top label in the supply before it is carried into position to be affixed to a bottle, and an inking-pad arranged behind the label-supply to ink the stamp after it has engaged the label, substantially as described.

20. In a labeling-machine, the combination with a holder for a supply of labels, of a device for carrying a label from the supply into position to be affixed to a bottle, a stamp, and means for moving the supply of labels into contact first with the stamp and then with the carrying device, substantially as described.

21. In a labeling-machine, the combination with a holder for a supply of labels, of a device for carrying a label from the supply into position to be affixed to a bottle, a stamp and an inking-pad, and a means which moves the supply of labels into contact with the carrying device and also the inking-pad against the stamp, substantially as described.

22. In a labeling-machine, the combination with a holder for a supply of labels, of a swinging device for carrying the labels from the supply into position to be affixed to a bottle, a printing device, means for moving the top label of the supply into contact first with the printing device and then with the carrying device, and means for locking the carrying device in position to receive the said label, substantially as described.

23. In a bottle-labeling machine, which is normally at rest, the combination with vertically-operating affixing means, of a vertically-movable and spring-pressed label-supply holder, a pivoted swinging device for carrying a label from the supply into position to be affixed, a horizontally-reciprocating paste device arranged in the path of the carrier during a part of its rearward movement and adapted to be pushed backward thereby, means for returning the paste device to its forward position after the carrier has carried forward a label, a main shaft, a clutch mechanism, and a tripper operated by the insertion of a bottle in the machine to throw the clutch and start the machine and thereby actuate aforesaid parts, substantially as described.

FRANK C. H. STRASBURGER.

Witnesses:
WM. O. BELT,
I. C. HAHN.